Figure 1:
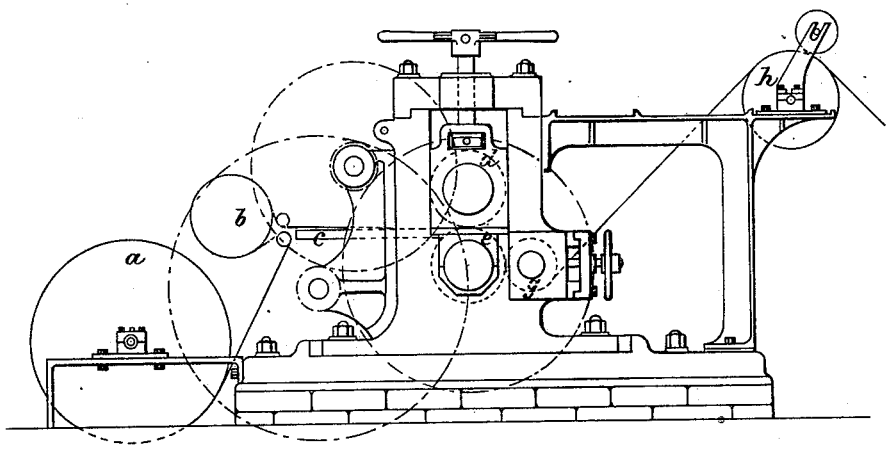

2 Sheets—Sheet 1.

F. WALTON.
Manufacture of Embossed Fabric.

No. 222,214. Patented Dec. 2, 1879.

WITNESSES:
Wm A. Skinkle
Geo N Breck

INVENTOR:
Frederick Walton.
By his Attorneys.
Baldwin, Hopkins & Payton

F. WALTON.
Manufacture of Embossed Fabric.

No. 222,214.   Patented Dec. 2, 1879.

UNITED STATES PATENT OFFICE.

FREDERICK WALTON, OF TWICKENHAM, COUNTY OF MIDDLESEX, ENGLAND.

IMPROVEMENT IN THE MANUFACTURE OF EMBOSSED FABRICS.

Specification forming part of Letters Patent No. 222,214, dated December 2, 1879; application filed October 23, 1879; patented in England, March 9, 1877.

*To all whom it may concern:*

Be it known that I, FREDERICK WALTON, of Heatham House, Twickenham, in the county of Middlesex, England, have invented new and useful Improvements in the Manufacture of Embossed Fabrics suitable for wall decorations, which improvements are fully set forth in the following specification, reference being had to the accompanying drawings.

This invention has for its object improvements in the manufacture of embossed fabrics suitable for wall decorations. For this purpose I employ a composition of which oxidized or highly-boiled oil is the chief ingredient, and similar in that respect to the composition employed for the manufacture of linoleum and such like floor-cloths. I spread this composition upon a fabric, and at the same operation, or while the composition is still soft, I emboss it with an ornamental pattern, after which I proceed to harden the material by hanging it in a heated chamber, where it is kept for a considerable period. The embossed material is afterward further decorated by the application of color.

In order that my said invention may be most fully understood and readily carried into effect, I will proceed to describe in detail the manner in which I prefer to conduct the manufacture.

I take a solidifying drying-oil. I prefer to employ that obtained by spreading, suitably, linseed-oil over a large surface, and so submitting it to the action of the air. This material goes by the trade-name of "oxidized oil;" but drying-oil rendered solid by long boiling at a high temperature, with suitable chemicals, until the oil becomes solid, when cold, may also be used.

In using the first method, I mix one hundred pounds of solidified oil with ten pounds of kaurie gum and ten pounds of resin. Of this composition I take forty-seven parts and add to it wood fiber, thirty-seven pounds; bronze-green, one pound; paraffine-wax, two pounds; resin, two pounds. This is for a neutral green color. Other shades are obtained by substituting other pigments for the bronze-green.

When I use oil solidified by long boiling I proceed as follows: I take fifty pounds of oil and add thereto two to five per cent. of litharge, red lead, or lime, to cause it to dry and harden. To this fifty pounds of oil I add forty pounds fiber of wood and ten pounds dry color.

I add the lime in some cases at the beginning of the operation of mixing, and in others at the latter part of it, according as the oil is more or less oxidized. I find it also useful to use a combination of oil oxidized by the two methods.

The fiber I prefer to employ is that used by paper-makers; but I obtain it in the dry and loose condition.

Where a very smooth surface is not required, I use ground cork or such like material. The ingredients are mixed in a mixer, such as is used in the manufacture of floor-cloth. Then I proceed to spread the material upon a fabric. I usually employ a comparatively thin woven fabric combined with paper.

The annexed drawings represent the spreading and embossing machine, in respect to which, however, I make no claim.

Figure 2:
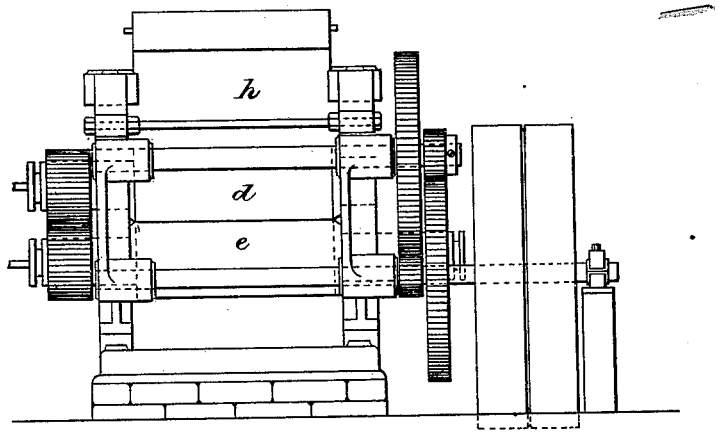
Figure 3:
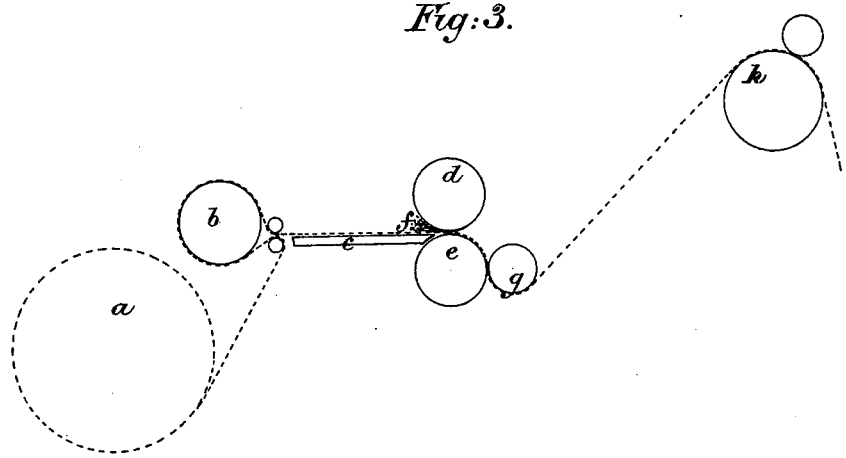

Figure 1 is a side elevation. Fig. 2 is an end elevation. Fig. 3 is a longitudinal section of some of the parts.

$a$ is a roller or wheel, from which the backing fabric is drawn. It passes around a drum, $b$, to which a brake is applied for regulating the tension. $c$ is a table, over which the backing fabric passes to the spreading-rollers $d$ and $e$.

To effect the spreading I employ two metal rollers, set with their axes parallel, and with their surfaces at a short distance apart. I lead the fabric upon which the composition is to be spread over one of the rollers. The composition I place between the two.

$f$ is the mass of material passing with the backing between the rollers, and so being reduced approximately to the desired thickness. As the rollers revolve, the composition is drawn in and forms a sheet between the fabric and the roller of a thickness dependent on the distance the rollers are set apart. I then cause the sheet to pass under a roller of metal having the desired pattern recessed into it, and this embossing-roller is so set as to compress the sheet between its own surface and that of the lower or first-mentioned roller, over which the fabric to be spread is passed, and in this way an embossed pattern is raised upon the surface of the sheet.

g is the embossing-roller. h is a wooden drum covered with wire cards for drawing off the compound embossed fabric from the machine.

In some cases, in order to prevent adhesion of the material, I pass a very light silken or other fabric over the embossing-roller. I previously damp the fabric with water or moisten with oil. I afterward strip off the fabric from the face of the embossed sheet. In some cases I prefer not to strip it. In such case I do not wet or grease it.

Figure 4:
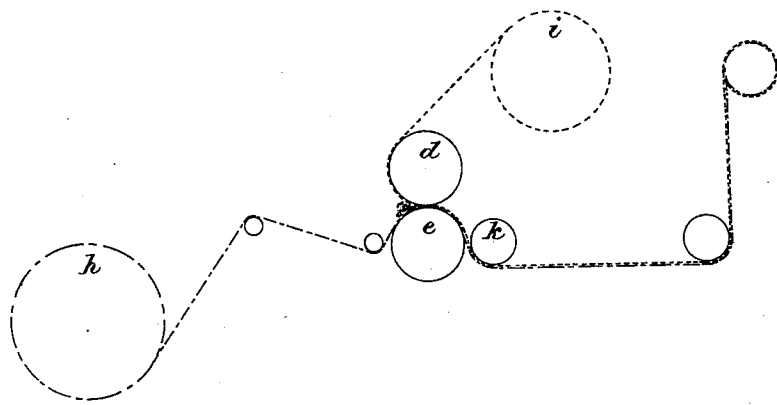

The fabric, if stripped off, can be used many times. When a double fabric of woven material and paper is employed as the backing, the same machine, with some rearrangement of the parts, is employed in the preparation of the backing. It is thus represented in Fig. 4. The paper is drawn from a roller, $h$, and the cloth from a roll, $i$. They pass together between the rollers $d$ and $e$, and are there combined by the aid of a cementing material supplied between them. A guide-roller, $k$, takes the place of the embossing-rollers $g$.

A suitable cementing material is composed of oxidized oil, twelve parts; kauri gum, two parts; resin, two parts; ocher, twenty-four parts; turpentine, two and a half parts.

I hang the embossed sheet up in drying-chamber, and there I keep it for about a fortnight until the composition is thoroughly hardened to the same degree as it is usual to harden linoleum and such like floor-cloth. I prefer to expose the fabric to about 90° Fahrenheit, the air being frequently changed by ventilators or fans. Afterward the material is further decorated by the application of color and gold, either by hand or otherwise.

In some cases I form checkered or cross lines on the face of the embossing-roller in such manner as to produce upon the embossed sheet an appearance of stitches, as if it were a woven tapestry or needle-work fabric or tapestry-carpet; and the material being afterward further ornamented by the application of various colors, either by printing or by hand, so that the color lies on the slightly-projecting points resulting from the checkering, a close resemblance to needle-work or loom-work is obtained.

In place of spreading and embossing in the same machine, these operations may be performed separately and with some interval between them, so long as the composition is not permitted to become too hard; or, again, in place of spreading with a smooth-surfaced roller, the embossing-roller may be made to serve the double purpose of spreading and embossing; but I prefer to conduct the manufacture in the manner above described.

When a face-fabric is employed which it is not intended to strip off, I prefer to prepare this fabric by giving to it previous to use a thin coating of composition, and so I form a face upon it similar to that of artificial leather.

In order to facilitate the application of color to the embossed pattern with accurate register, I sometimes produce on each side of the sheet, by means of the embossing-roller, a line or row of rack-like teeth, and I apply the color by means of a roller with a pattern upon it, and also provided with teeth which engage with the rack-like teeth on the sheet in process of printing. After printing, these toothed edges are cut off, and the material of which they are composed can be reworked.

Having thus described the nature of my said invention and the manner of performing the same, I would have it understood that I claim—

1. The manufacture of embossed fabrics suitable for wall decoration by spreading a composition of solidified oil upon a paper or fabric, producing a raised pattern by means of an embossing-surface, and then hardening the embossed sheet, substantially as described.

2. The manufacture of embossed fabrics suitable for wall decoration by spreading a composition of solidified oil upon a compound backing consisting of woven fabric and paper cemented together, and producing a raised pattern by means of an embossing-surface, substantially as described.

3. The manufacture of embossed and variously-colored fabrics suitable for wall decoration by spreading a composition of solidified oil upon a backing-fabric, producing raised pattern by means of an embossing-surface, and applying color to such raised surface, substantially as described.

4. The manufacture of embossed and variously-colored fabrics suitable for wall decoration, and resembling woven tapestry or needlework, by spreading a composition upon a backing-surface, and by producing thereon a raised checkered and colored pattern, such that the color lies on the points of the checkering, and thereby imitates stitches, substantially as described.

5. The means of obtaining accurate register when printing fabrics, such as herein described, by embossing rack-like teeth upon the edges of the fabric, to engage with corresponding teeth used upon or in connection with a printing-roller, substantially as described.

FREDERICK WALTON.

Witnesses:
  CHAS. BERKLEY HARRIS,
*Clerk to Messrs. Sener & Harris,* 17 *Gracechurch Street, London.*
  JOHN DEAN,
    17 *Gracechurch Street, London.*